United States Patent [19]
Sauve

[11] Patent Number: 5,228,528
[45] Date of Patent: Jul. 20, 1993

[54] TRACK FOR TRACKED MOTORCYCLE

[76] Inventor: Bernard Sauve, 4780, avenue Pierre-de-Coubertin, Apt. 4, Montréal (Québec), Canada, H1V 1B1

[21] Appl. No.: 671,201

[22] Filed: Mar. 18, 1991

[30] Foreign Application Priority Data

Jul. 19, 1989 [GB] United Kingdom ............ 8916533.6

[51] Int. Cl.⁵ ............................................. B62D 55/00
[52] U.S. Cl. .................................. 180/9.25; 180/9.1; 280/28.5; 305/41; 305/53
[58] Field of Search ................. 180/9, 9.1, 9.21, 9.25, 180/9.26, 9.28, 10; 280/28.5; 305/41, 53, 50, 40

[56] References Cited

U.S. PATENT DOCUMENTS

| | | | |
|---|---|---|---|
| 2,827,972 | 3/1958 | West | 180/9.1 |
| 3,157,913 | 11/1964 | Hubert | 180/9.24 |
| 3,589,463 | 6/1971 | Stowers | 180/9.25 |
| 4,448,273 | 5/1984 | Barbieri | 305/41 |
| 4,453,611 | 6/1984 | Stacy, Jr. | 180/9.44 |
| 4,613,006 | 9/1986 | Moss et al. | 180/9.25 |
| 4,635,740 | 1/1987 | Krueger et al. | 180/921 |
| 4,699,229 | 10/1987 | Hirose et al. | 180/9.25 X |
| 4,957,332 | 9/1990 | Batelaan | 305/53 |
| 4,981,188 | 1/1991 | Kadela | 180/9.25 |

FOREIGN PATENT DOCUMENTS

2018480 4/1970 Fed. Rep. of Germany.

*Primary Examiner*—Margaret A. Focarino
*Assistant Examiner*—Kevin Hurley
*Attorney, Agent, or Firm*—Longacre & White

[57] ABSTRACT

The invention relates to a track specially designed for vehicles such as motorcycles and bicycles. This track, which is transversely curved, allows the vehicle to move when in an upright position or when tilted sideways. Its main characteristics are that it comprises a curved belt, consisting of flexible straps and rigid curved runners, as well as internal support belts supporting the sides of the runners which are in contact with the ground. The claims of the invention relate to the transversal curvature of the track and to the use of internal support belts.

7 Claims, 4 Drawing Sheets

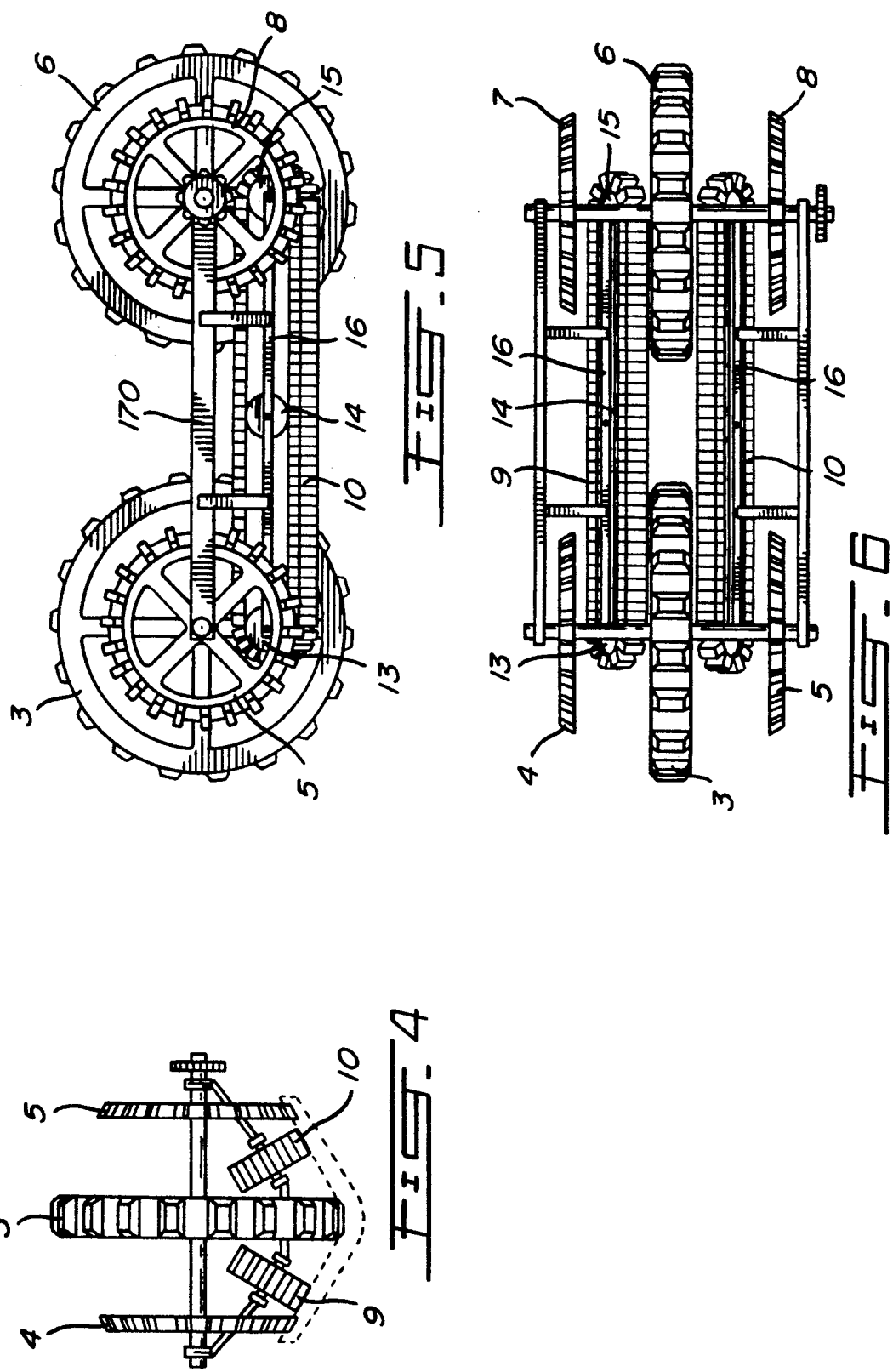

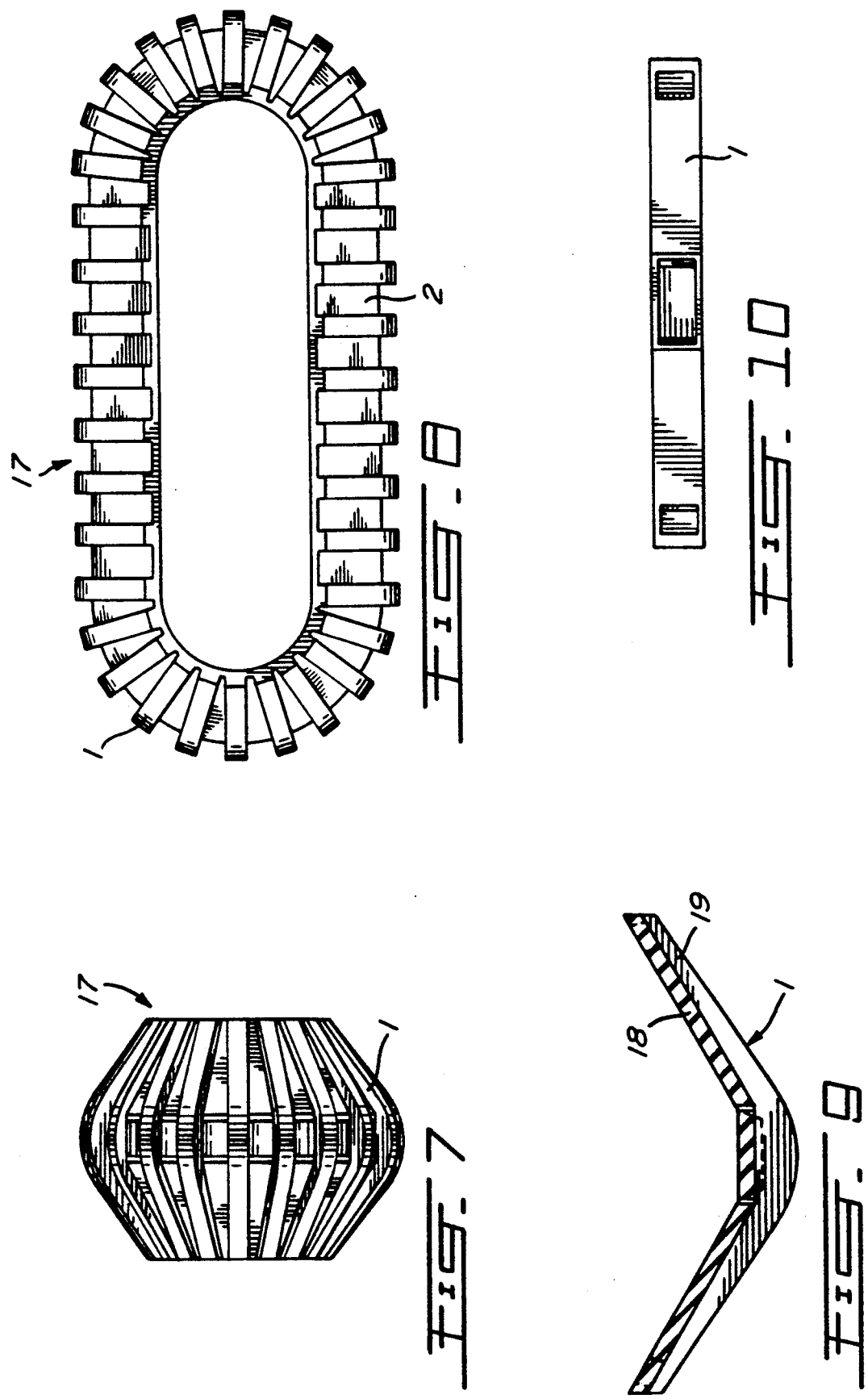

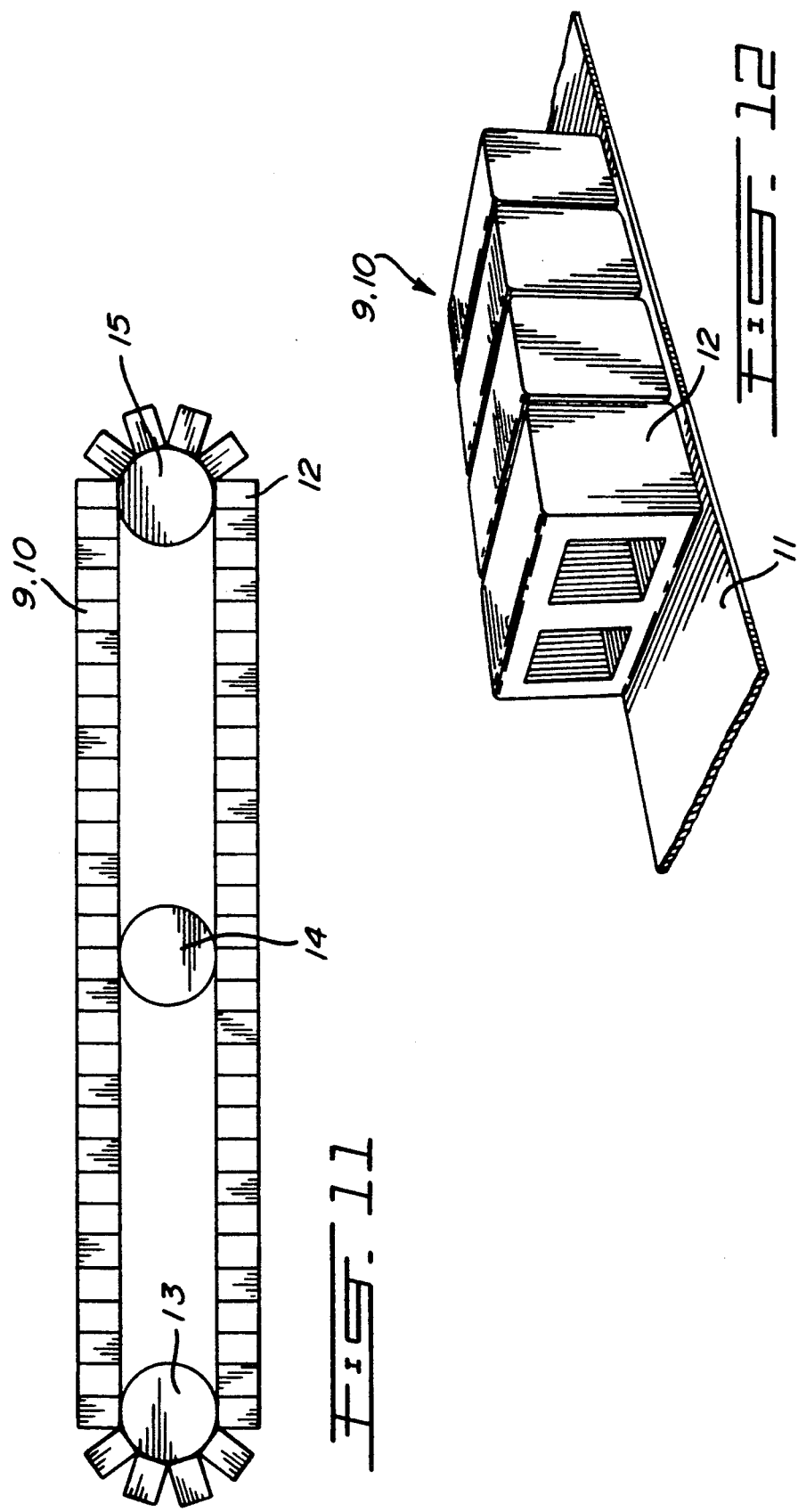

TRACK FOR TRACKED MOTORCYCLE

BACKGROUND OF THE INVENTION

The present invention relates to a track designed for vehicles such as motorcycles; a "tracked motorcycle" provided with two tracks.

The use of tracks, for this type of vehicle should allow the latter to move when tilted sideways in the same manner as a conventional motorcycle taking a turn.

Object of the Invention

To that effect, the present invention provides a transversely curved track; characteristic that no actual track owns.

SUMMARY OF THE INVENTION

More specifically, the present invention relates to a track assembly for a cycle, comprising an endless traction belt including endless flexible strap means having an outer surface on which a series of transverse, substantially rigid runners are mounted. The transverse runners are curved to form the traction belt with a transversely convex external surface and a transversely concave internal surface. The endless traction belt also comprises a lower ground-engaging run and is mounted on first and second end wheel systems. At least one of the first and second wheel systems comprise means for engaging the traction belt in order to drive the same. Belt support means are mounted between the first and second wheel systems and applied to the transversely concave internal surface of the lower ground-engaging run to support the lower run when it engages the ground.

Preferably, the belt support means comprise at least one internal endless support belt applied to the transversely concave internal surface of the lower ground-engaging run to move longitudinally therewith, this support belt being structured to resist to bending toward the interior as the lower run engages the ground. To that effect, the support belt may comprise an inner endless strap means and a series of generally rectangular blocks mounted end to end on the outer surface of this inner strap means. The traction belt comprises a substantially vertical plane of symmetry, and the belt support means comprise two internal endless support belts symmetrical about the latter plane.

In accordance with another preferred embodiment, the curved runners are generally V-shaped.

The objects, advantages and other features of the present invention will become more apparent upon reading of the following non restrictive description of a preferred embodiment thereof, given by way of example only with reference to the accompanying drawings.

BRIEF DESCRIPTION OF THE DRAWINGS

In the appended drawings:

FIG. 4 is a front elevational view of driving and support mechanisms of the track assembly of FIGS. 1, 2 and 3;

FIG. 5 is a side elevational view of the mechanisms of FIG. 4;

FIG. 6 is a top plan view of the mechanisms of FIG. 4;

FIG. 7 is a front elevational view of an endless traction belt of the track assembly of FIGS. 1, 2 and 3;

FIG. 8 is a side elevational view of the endless traction belt of FIG. 7;

FIG. 9 is an enlarged, front elevational view of a runner of the traction belt of FIGS. 7 and 8;

FIG. 10 is an enlarged, top plan view of the runner of FIG. 9;

FIG. 11 is a side elevational view of an endless support belt of the support mechanism of FIGS. 4, 5 and 6; and FIG. 12 is an enlarged, isometric view of a section of the endless support belt of FIG. 11.

DETAILED DESCRIPTION OF THE PREFERRED EMBODIMENT

In the different figures of the appended drawings, the same elements are identified by the same references.

Figure 1:
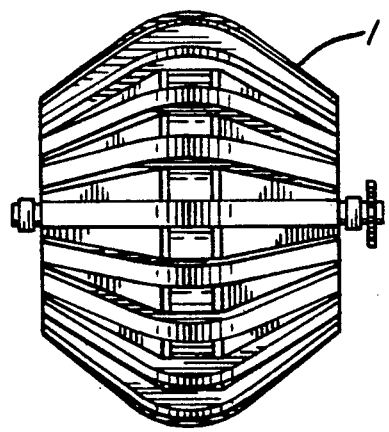
FIG. 1 is a front elevational view of a track assembly in accordance with the present invention.
Figure 2:
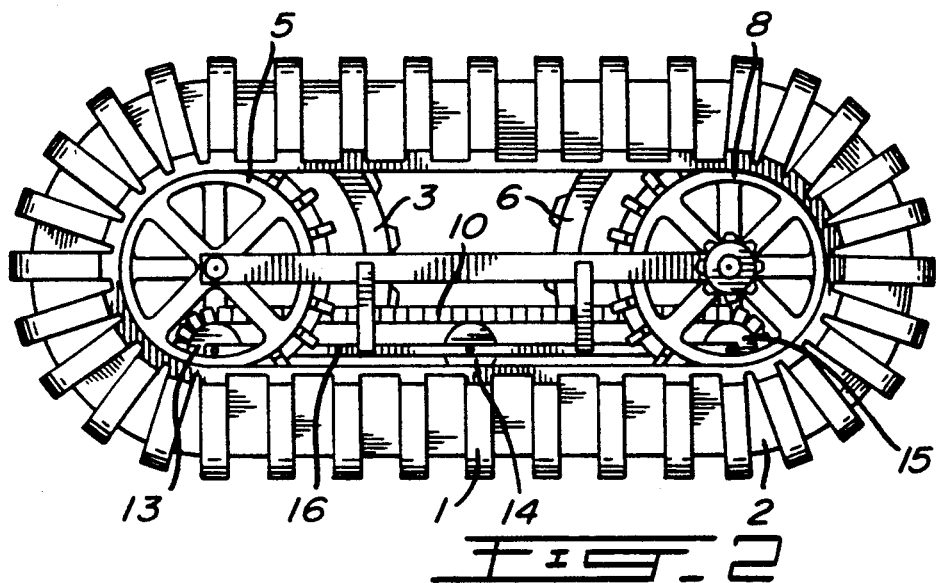
FIG. 2 is a side elevational view of the track assembly of FIG. 1.

The curvature is given to the traction belt 17 by the shape of its runners (1), which runners are interconnected by means of flexible straps (2). The flexibility of these straps is here necessary because the spacing between the ends of the runners narrows when they turn around the wheels (3–8) forming the ends of the track. This phenomenon can be seen on FIGS. 2 and 8.

We are therefore in the presence of a track of which the belt flexibility imposes a continuous support of this belt over the entire length thereof, in order to prevent eventual breaking through toward the interior which can happen at points where the belt is not supported. This is the function of the two internal belts (9 and 10) on which the runners of the lower part of the track rest, at right angle. As can be seen on sheet FIG. 4, the support belts 9 and 10 define an angle of 90° with the portions of the runners 1 resting thereon, thereby providing for a strong support to these runner portions when the track tilts sideways. Each of these support belts is formed of a strap 11 (FIG. 12) made of braided polymer fibers on which are fixed, side by side, pieces of metallic alloy (12 covering entirely over its length a face of the strap (11). This structure results into a belt resisting to bending toward the interior while the flexibility of its strap toward the exterior is maintained to allow it to turn around its rollers 13, 14 and 15. Each of the support belts is mounted on a plurality of rollers, three in the present case, which are connected to each other by means of metallic bars 16 which are fixed to the frame 170 of the track through these metallic bars (16.

Figure 3:
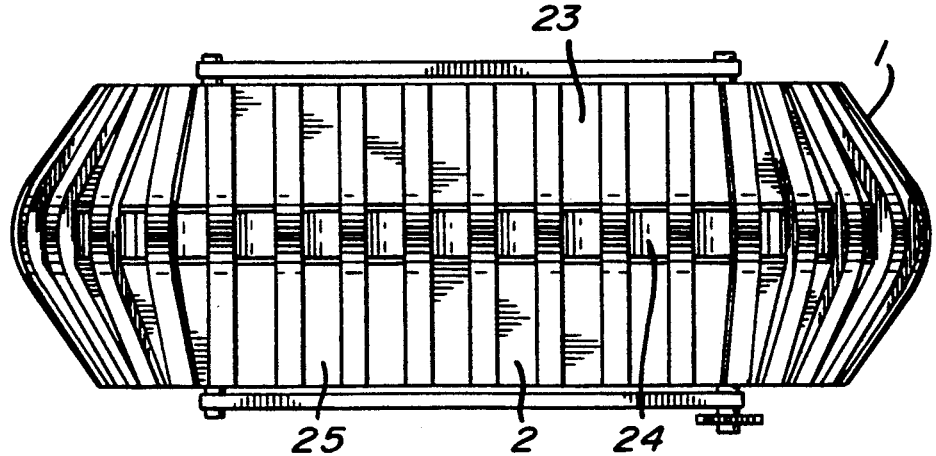
FIG. 3 is a top plan view of the track assembly of FIG. 1.

The traction belt 17) is formed of three independent straps 23, 24 and 25 (FIG. 3) made of braided polymer fibers slightly coated with rubber on which are fixed the runners 1 by means of screws or of other methods. These runners present the configuration of a "V" having a flared base at the inside and a rounded base at the outside (sheet FIG. 9). The internal part 18 is rigid; made either of a metallic alloy, or a composite material such as KEVLAR (aromatic polyamide fiber of extremely high tensile strength and greater resistance to elongation than steel, and having high energy-absorption property). The external part (19 is a rubber covering. The function of the holes (20, 21 and 22, is to fit the runners into the driving wheels (3–8) respectively.

The embodiments of the invention in which an exclusive property or privilege is claimed are defined as follows:

1. A track assembly for a cycle, comprising:
   an endless traction belt including endless flexible strap means having an outer surface on which a series of transverse, substantially rigid runners are mounted, said transverse runners being curved to form said traction belt with a transversely convex external surface and a transversely concave internal surface, said endless traction belt having a lower ground-engaging run;
   first and second end wheel systems on which said endless traction belt is mounted, at least one of said first and second wheel systems comprising means for engaging said traction belt in order to drive the said endless traction belt; and
   belt support means mounted between the first and second wheel systems and applied to the transversely concave internal surface of said lower ground-engaging run to support said lower run when it engages the ground;
   wherein said belt support means comprise at least one internal endless support belt applied to the transversely concave internal surface of said lower ground-engaging run to move longitudinally with said lower run, said support belt being structured to resist to bending toward the interior when said lower run engages the ground.

2. A track assembly as recited in claim 1, wherein said support belt comprises an inner endless strap means with an outer surface and a series of generally rectangular blocks mounted end to end on said outer surface of the inner endless strap means.

3. A track assembly as recited in claim 2, in which said support belt is mounted on a pair of end wheels, and on at least one wheel situated between said end wheels.

4. A track assembly as recited in claim 1, wherein said traction belt comprises a substantially vertical plane of symmetry, and wherein said at least one internal endless support belt comprises two internal endless support belts symmetrically disposed about said plane of symmetry and applied to the transversely concave internal surface of said lower ground-engaging run to move longitudinally with said lower run, each of said support belts comprising an inner endless strap means with an outer surface and a series of substantially rectangular blocks mounted end to end on said outer surface of the inner strap means.

5. A track assembly as recited in claim 1, in which said curved runners are generally V-shaped.

6. A track assembly for a cycle, comprising:
   an endless traction belt including endless flexible strap means having an outer surface on which a series of transverse, substantially rigid runners are mounted, said transverse runners being curved to form said traction belt with a transversely convex external surface and a transversely concave internal surface, said endless traction belt having a lower ground-engaging run;
   first and second end wheel systems on which said endless traction belt is mounted, at least one of said first and second wheel systems comprising means for engaging said traction belt in order to drive the said endless traction belt; and
   belt support means mounted between the first and second wheel systems and applied to the transversely concave internal surface of said lower ground-engaging run to support said lower run when it engages the ground;
   wherein each of said wheel systems comprises a set of three wheels rotating about a common transverse axis, said three wheels including first and second lateral wheels of smaller diameter and a central wheel of larger diameter situated between said first and second lateral wheels.

7. A track assembly as recited in claim 6, in which one of said lateral and central wheels of at least one of said wheel systems comprises peripheral teeth to engage the endless traction belt.

* * * * *